US006487301B1

(12) United States Patent
Zhao

(10) Patent No.: US 6,487,301 B1
(45) Date of Patent: Nov. 26, 2002

(54) DIGITAL AUTHENTICATION WITH DIGITAL AND ANALOG DOCUMENTS

(75) Inventor: Jian Zhao, Rumford, RI (US)

(73) Assignee: MediaSec Technologies LLC, Providence, RI (US)

( * ) Notice: Subject to any disclaimer, the term of this patent is extended or adjusted under 35 U.S.C. 154(b) by 0 days.

(21) Appl. No.: 09/874,490

(22) Filed: Jun. 5, 2001

Related U.S. Application Data

(63) Continuation-in-part of application No. 09/070,524, filed on Apr. 30, 1998, now Pat. No. 6,243,480.

(51) Int. Cl.[7] .................................................. G06K 9/00
(52) U.S. Cl. ...................................................... 382/100
(58) Field of Search ................................. 382/100, 175, 382/176, 177, 182, 183, 198, 206, 229, 232, 248, 250, 292, 302; 380/201, 216, 243, 245, 246, 51, 55, 56; 713/176, 179, 181; 399/366

(56) References Cited

U.S. PATENT DOCUMENTS

| | | | |
|---|---|---|---|
| 5,481,718 A | * 1/1996 | Ryu et al. | 709/316 |
| 5,521,722 A | * 5/1996 | Colvill et al. | 358/500 |
| 5,606,609 A | * 2/1997 | Houser et al. | 713/179 |
| 5,680,455 A | * 10/1997 | Linsker et al. | 380/246 |
| 5,689,567 A | * 11/1997 | Miyauchi | 713/176 |
| 5,948,103 A | * 9/1999 | Fukuzaki | 713/200 |
| 6,141,116 A | * 10/2000 | Odom et al. | 358/404 |
| 6,256,736 B1 | * 7/2001 | Coppersmith et al. | 713/176 |
| 6,345,104 B1 | * 2/2002 | Rhoads | 382/100 |

* cited by examiner

Primary Examiner—Andrew W. Johns
Assistant Examiner—Shervin Nakhjavan
(74) Attorney, Agent, or Firm—Gordon E. Nelson

(57) ABSTRACT

Techniques for incorporating authentication information into digital representations of objects and using the authentication information to authenticate the objects. The authentication information may be made from information in one portion of the digital representation and incorporated into another portion of the digital representation that does not overlap the first portion. Where the digital representation is made into an analog form and that in turn is made into a digital representation and the second digital representation is verified, the two portions must further be non-overlapping in the analog form. The information from which the authentication information is made may exist at many levels: representations of physical effects produced by the object, representations of features of the object, codes that represent the object's contents, and representations of descriptions of the object. Also disclosed are a verification server and techniques for reducing errors by an OCR. The verification server verifies authenticated documents. When a document is verified, an identifier is associated with the document and the identifier is used to locate a key for the authentication information and in some cases a second copy of the authentication information. The verification process may also involve security patterns that are a physical part of the analog form. The error reduction techniques include an error code specifying characters in the object that are confusing to OCR devices, and the error code is used to correct the results of an OCR reading of an analog form.

18 Claims, 7 Drawing Sheets

US 6,487,301 B1

DIGITAL AUTHENTICATION WITH DIGITAL AND ANALOG DOCUMENTS

CROSS REFERENCE TO RELATED PATENT APPLICATIONS

This application is a continuation-in-part of U.S. Ser. No. 09/070,524, Jian Zhao, et al., Digital authentication with analog documents, filed Apr. 30, 1998 and issuing as U.S. Pat. No. 6,243,480 on Jun. 5, 2001. This application contains the complete discussion of digital authentication with analog documents from the parent. The new material begins with the section titled Additional classes of semantic information.

BACKGROUND OF THE INVENTION

1. Field of the Invention

The invention relates generally to digital representations of images and other information and more specifically to techniques for protecting the security of digital representations and of analog forms produced from them.

2. Description of the Prior Art

Nowadays, the easiest way to work with pictures or sounds is often to make digital representations of them. Once the digital representation is made, anyone with a computer can copy the digital representation without degradation, can manipulate it, and can send it virtually instantaneously to anywhere in the world. The Internet, finally, has made it possible for anyone to distribute any digital representation from anywhere in the world From the point of view of the owners of the digital representations, there is one problem with all of this: pirates, too, have computers, and they can use them to copy, manipulate, and distribute digital representations as easily as the legitimate owners and users can. If the owners of the original digital representations are to be properly compensated for making or publishing them, the digital representations must be protected from pirates. There are a number of different approaches that can be used:

- the digital representation may be rendered unreadable except by its intended recipients; this is done with encryption techniques;
- the digital representation may be marked to indicate its authenticity; this is done with digital signatures;
- the digital representation may contain information from which it may be determined whether it has been tampered with in transit; this information is termed a digest and the digital signature often includes a digest;
- the digital representation may contain a watermark, an invisible indication of ownership which cannot be removed from the digital representation and may even be detected in an analog copy made from the digital representation; and the above techniques can be employed in systems that not only protect the digital representations, but also meter their use and/or detect illegal use. For an example of a system that uses encryption to protect digital representations, see U.S. Pat. No. 5,646,999, Saito, Data Copyright Management Method, issued Jul. 8, 1997; for a general discussion of digital watermarking, see Jian Zhao, "Look, It's Not There", in: *BYTE Magazine,* January, 1997. Detailed discussions of particular techniques for digital watermarking may be found in E. Koch and J. Zhao, "Towards Robust and Hidden Image Copyright Labeling", in: *Proc. Of* 1995 *IEEE Workshop on Nonlinear Signal and Image Processing,* Jun. 20–22, 1995, and in U.S. Pat. No. 5,710,834, Rhoads, Method and Apparatus Responsive to a Code Signal Conveyed through a Graphic Image, issued Jan. 20, 1998. For an example of a commercial watermarking system that uses the digital watermarking techniques disclosed in the Rhoads patent, *see Digimarc Watermarking Guide,* Digimarc Corporation, 1997, available at http://www.digimarc,com in March, 1998.

FIG. 1 shows a prior-art system 101 which employs the above protection techniques. A number of digital representation clients 105, of which only one, digital representation client 1050) is shown, are connected via a' network 103 such as the Internet to a digital representation server 129 which receives digital representations from clients 105 and distributes them to clients 105. Server 129 includes a data storage device 133 which contains copied digital representations 135 for distribution and a management database 139. Server 129 further includes a program for managing the digital representations 135, a program for reading and writing watermarks 109, a program for authenticating a digital representation and confirming that a digital representation is authentic 111, and a program for encrypting and decrypting digital representations 113. Programs 109, 111, and 113 together make up security programs 107.

Client 105 has its own versions of security programs 107; it further has editor/viewer program 115 which lets the user of client 105 edit and/or view digital representations that it receives via network 103 or that are stored in storage device 117. Storage device 117 as shown contains an original digital representation 119 which was made by a user of client 105 and a copied digital representation 121 that was received from DR Server 129. Of course, the user may have made original representation 119 by modifying a copied digital representation. Editor/viewer program 115, finally, permits the user to output digital representations to analog output devices 123. Included among these devices are a display 125, upon which an analog image 124 made from a digital representation may be displayed and a printer 127 upon which an analog image 126 made from the digital representation may be printed. A loudspeaker may also be included in analog output devices 123. The output of the analog output device will be termed herein an analogform of the digital representation. For example, if the output device is a printer, the analog form is printed sheet 126; if it is a display device, it is display 124.

When client 105(*j*) wishes to receive a digital representation from server 129, it sends a message requesting the digital representation to server 129. The message includes at least an identification of the desired digital representation and an identification of the user. Manager 131 responds to the request by locating the digital representation in CDRs 135, consulting management data base 139 to determine the conditions under which the digital representation may be distributed and the status of the user of client 105 as a customer. If the information in data base 139 indicates to manager 131 that the transaction should go forward, manager 131 sends client 1050) a copy of the selected digital representation. In the course of sending the copy, manager 131 may use watermark reader/writer 109 to add a watermark to the digital representation, use authenticator/confirmer 111 to add authentication information, and encrypter/decrypter 113 to encrypt the digital representation in such a fashion that it can only be decrypted in DR client 105(*j*).

When client 105(*j*) receives the digital representation, it decrypts it using program 113, confirms that the digital representation is authentic using program 111, and editor/viewer 115 may use program 109 to display the watermark. The user of client 1050) may save the encrypted or unencrypted digital representation in storage 117. The user of client 105 (*j*) may finally employ editor/viewer 115 to decode the digital representation and output the results of the decoding to an analog output device 123. Analog output device 123 may be a display device 125, a printer 127, or in the case of digital representations of audio, a loudspeaker.

It should be pointed out that when the digital representation is displayed or printed in analog form, the only remaining protection against copying is watermark 128, which cannot be perceived in the analog form by the human observer, but which can be detected by scanning the analog form and using a computer to find watermark 128. Watermark 128 thus provides a backup to encryption: if a digital representation is pirated, either because someone has broken the encryption, or more likely because someone with legitimate access to the digital representation has made illegitimate copies, the watermark at least makes it possible to determine the owner of the original digital representation and given that evidence, to pursue the pirate for copyright infringement and/or violation of a confidentiality agreement.

If the user of client 105(*j*) wishes to send an original digital representation 119 to DR server 129 for distribution, editor/viewer 115 will send digital representation 119 to server 129. In so doing, editor/viewer 115 may use security programs 107 to watermark the digital representation, authenticate it, and encrypt it so that it can be decrypted only by DR Server 129. Manager 131 in DR server 129 will, when it receives digital representation 119, use security programs 107 to decrypt digital representation 119, confirm its authenticity, enter information about it in management data base 139, and store it in storage 133.

In the case of the Digimarc system referred to above, manager 131 also includes a World Wide Web spider, that is, a program that systematically follows World Wide Web links such as HTTP and FTP links and fetches the material pointed to by the links.

Manager program 131 uses watermark reading/writing program to read any watermark, and if the watermark is known to management database 139, manager program 131 takes whatever action may be required, for example, determining whether the site from which the digital representation was obtained has the right to have it, and if not, notifying the owner of the digital representation.

While encryption, authentication, and watermarking have made it much easier for owners of digital representations to protect their property, problems still remain. One such problem is that the techniques presently used to authenticate digital documents do not work with analog forms; consequently, when the digital representation is output in analog form, the authentication is lost. Another is that present-day systems for managing digital representations are not flexible enough. A third is that watermark checking such as that done by the watermark spider described above is limited to digital representations available on the Internet. It is an object of the present invention to overcome the above problems and thereby to provide improved techniques for distributing digital representations.

SUMMARY OF THE INVENTION

One aspect of the invention is an improved general understanding of the techniques for hiding authentication information first disclosed in the parent patent application. As presently understood, apparatus which authenticates a digital representation of an object will have an authenticator which uses first information in a first portion of the digital representation to produce first authentication information and an incorporator which incorporates the first authentication information in a second portion of the digital representation which does not overlap the first portion.

The authentication information may be produced from more significant portions of items of data that represent physical effects and may be incorporated into less significant portions of such items that do not overlap the more significant portions. The authentication information may further be produced from a first specific region of an image and incorporated into a second specific region that does not overlap the first specific region or from a document layer and incorporated into an image layer that is separate from the document layer in the digital representation. With any of the above aspects of the invention, the authentication information may also be semantic information. Semantic information may further include vector data, content codes, and metadata.

Another aspect of the invention is apparatus for determining authenticity of a digital representation of an object where the digital representation includes embedded first authentication information. The apparatus includes a storage system in which stored keys are associated with stored reference numbers and a processor that receives the digital representation and a reference code associated with the digital representation. The processor further includes an authentication information reader and a comparator. The processor employs the reference code to retrieve a key associated with the reference number from the storage system and the authentication information reader uses the key to read the embedded first authentication information. The comparator then compares the read first authentication information with second authentication information. The second authentication information may either be stored in the storage system and retrievable by the reference code or may be semantic information in the digital representation which is read as described in the parent. The digital representation may have been made from an analog form and the analog form may have included a security pattern that is a physical part of the analog form. The security pattern may be included with the digital representation and may be used in determining authenticity of the digital representation.

Another aspect of the invention is a technique for reducing the errors due to an OCR device when a first digital document that contains one or more alphanumeric characters that confuse the OCR device is the source of an analog form that is scanned to produce a second digital document that is read by the OCR device. In the technique, the first digital document is searched to find the confusing alphanumeric characters and a character string of the found confusing characters is made. The order of the confusing characters in the character string is determined by the order of the confusing characters in the first digital document. A representation of the character string is then incorporated into the digital document in a portion thereof that does not overlap with the representations of the alphanumeric characters. The representation may be incorporated as a watermark.

Other objects and advantages of the invention will be apparent to those skilled in the arts to which the invention pertains upon perusing the following Detailed Description and Drawing, wherein:

Figure 1:
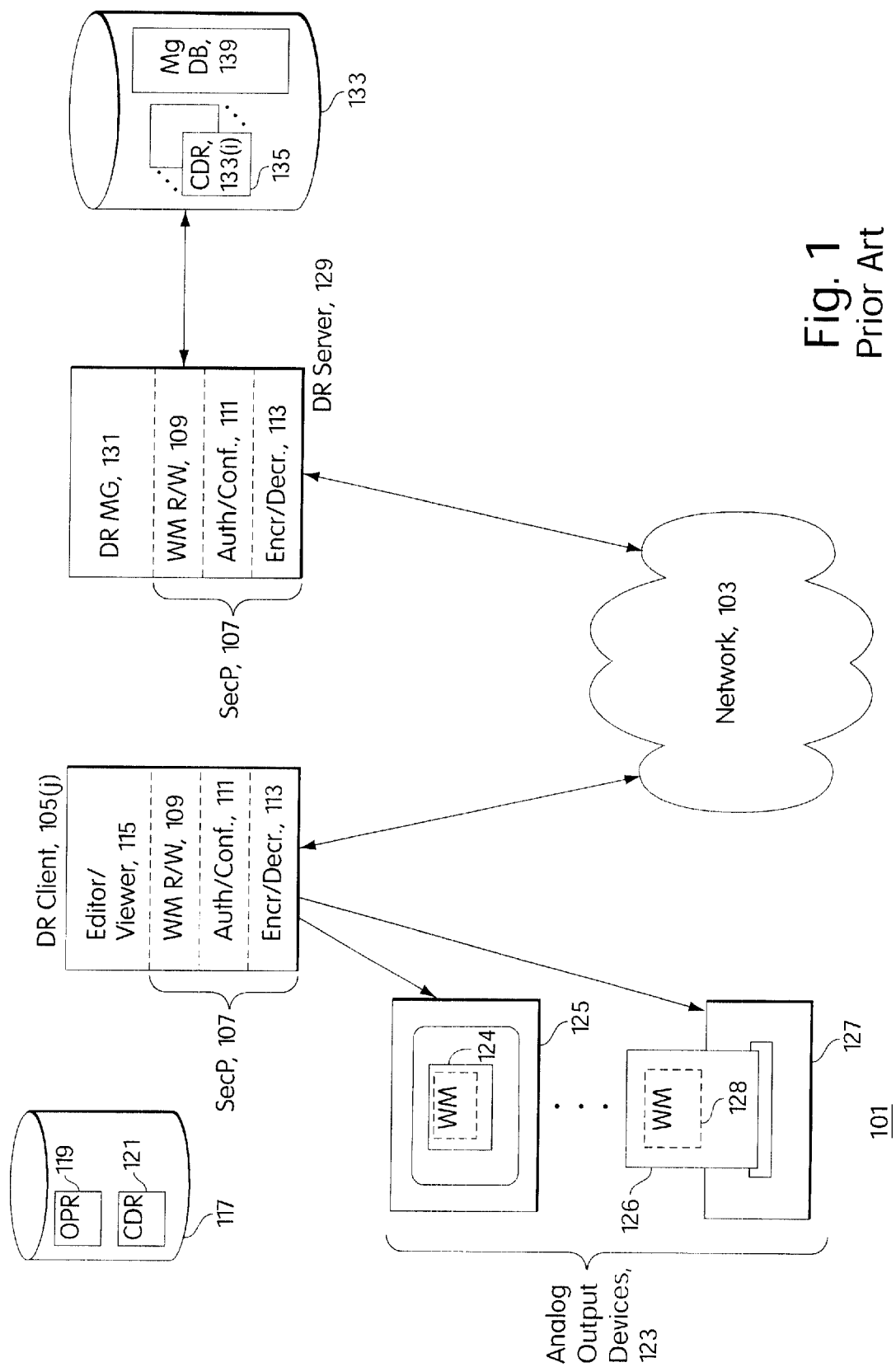
FIG. 1 is a block diagram of a prior-art system for securely distributing digital representations.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

DETAILED DESCRIPTION

The following Detailed Description will first disclose a technique for authenticating digital representations that survives output of an analog form of the digital representation, will then disclose active watermarks, that is, watermarks that contain programs, and will finally disclose watermark agents, that is, programs which examine the digital watermarks on digital representations stored in a system and thereby locate digital representations that are being used improperly.

Authentication that is Preserved in Analog Forms: FIGS. 2–5

Digital representations are authenticated to make sure that they have not been altered in transit. Alteration can occur as a result of transmission errors that occur during the course of transmission from the source of the digital representation to its destination, as a result of errors that arise due to damage to the storage device being used to transport the digital representation, as a result of errors that arise in the course of writing the digital representation to the storage device or reading the digital representation from the storage device, or as a result of human intervention. A standard technique for authentication is to make a digest of the digital representation and send the digest to the destination together with the digital representation. At the destination, another digest is made from the digital representation as received and compared with the first. If they are the same, the digital representation has not changed. The digest is simply a value which is much shorter than the digital representation but is related to it such that any change in the digital representation will with very high probability result in a change to the digest.

Where human intervention is a serious concern, the digest is made using a one-way hash function, that is, a function that produces a digest from which it is extremely difficult or impossible to learn anything about the input that produced it. The digest may additionally be encrypted so that only the recipient of the digital representation can read it. A common technique is to use the encrypted digest as the digital signature for the digital representation, that is, not only to show that the digital representation has not been altered in transit, but also to show that it is from whom it purports to be from. If the sender and the recipient have exchanged public keys, the sender can make the digital signature by encrypting the digest with the sender's private key. The recipient can use the sender's public key to decrypt the digest, and having done that, the recipient compares the digest with the digest made from the received digital representation. If they are not the same, either the digital representation has been altered or the digital representation is not from the person to whom the public key used to decrypt the digest belongs. For details on authentication, see Section 3.2 of Bruce Schneier, *Applied Cryptography,* John Wiley and Sons, 1994.

The only problem with authentication is that it is based entirely on the digital representation. The information used to make the digest is lost when the digital representation is output in analog form. For example, if the digital representation is a document, there is no way of determining from a paper copy made from the digital representation whether the digital representation from which the paper copy was made is authentic or whether the paper copy is itself a true copy of the digital representation.

While digital watermarks survive and remain detectable when a digital representation is output in analog form, the authentication problem cannot be solved simply by embedding the digest or digital signature in the watermark. There are two reasons for this:

Watermarking changes the digital representation; consequently, if a digital representation is watermarked after the original digest is made, the watermarking invalidates the original digest, i.e., it is no longer comparable with the new digest that the recipient makes from the watermarked document.

More troublesome still, when a digital representation is output in analog form, so much information about the digital representation is lost that the digital representation cannot be reconstructed from the analog form. Thus, even if the original digest is still valid, there is no way of producing a comparable new digest from the analog form.

What is needed to overcome these problems is an authentication technique which uses information for authentication which is independent of the particular form of the digital representation and which will be included in the analog form when the analog form is output. As will be explained in more detail in the following, the first requirement is met by selecting semantic information from the digital representation and using only the semantic information to make the digest. The second requirement is met by incorporating the digest into the digital representation in a fashion such that it on the one hand does not affect the semantic information used to make the digest and on the other hand survives in the analog form In the case of documents, an authentication technique which meets these requirements can be used not only to authenticate analog forms of documents that exist primarily in digital form, but also to authenticate documents that exist primarily or only in analog form, for example paper checks and identification cards.

Semantic Information

The semantic information in a digital representation is that portion of the information in the digital representation that must be present in the analog form made from the digital representation if the human who perceive the analog form is to consider it a copy of the original from which the digital representation was made. For example, the semantic information in a digital representation of an image of a document is the representations of the alphanumeric characters in the document, where alphanumeric is understood to include representations of any kind of written characters or punctuation marks, including those belonging to non-Latin alphabets, to syllabic writing systems, and to ideographic writing systems. Given the alphanumeric characters, the human recipient of the analog form can determine whether a document is a copy of the original, even though the characters may have different fonts and may have been formatted differently in the original document. There is analogous semantic information in digital representations of pictures and of audio information. In the case of pictures, it is the information that is required for the human that perceives the analog form to agree that the analog form is a copy (albeit a bad one) of the original picture, and the same is the case with audio information.

In the case of a document written in English, the semantic information in the document is the letters and punctuation of the document. If the document is in digital form, it may be represented either as a digital image or in a text representation language such as those used for word processing or printing. In the first case, optical character recognition (OCR) technology may be applied to the image to obtain the letters and punctuation; in the second case, the digital representation may be parsed for the codes that are used to represent the letters and punctuation in the text representation language. If the document is in analog form, it may be scanned to produce a digital image and the OCR technology applied to the digital image produced by scanning.

Figure 2:
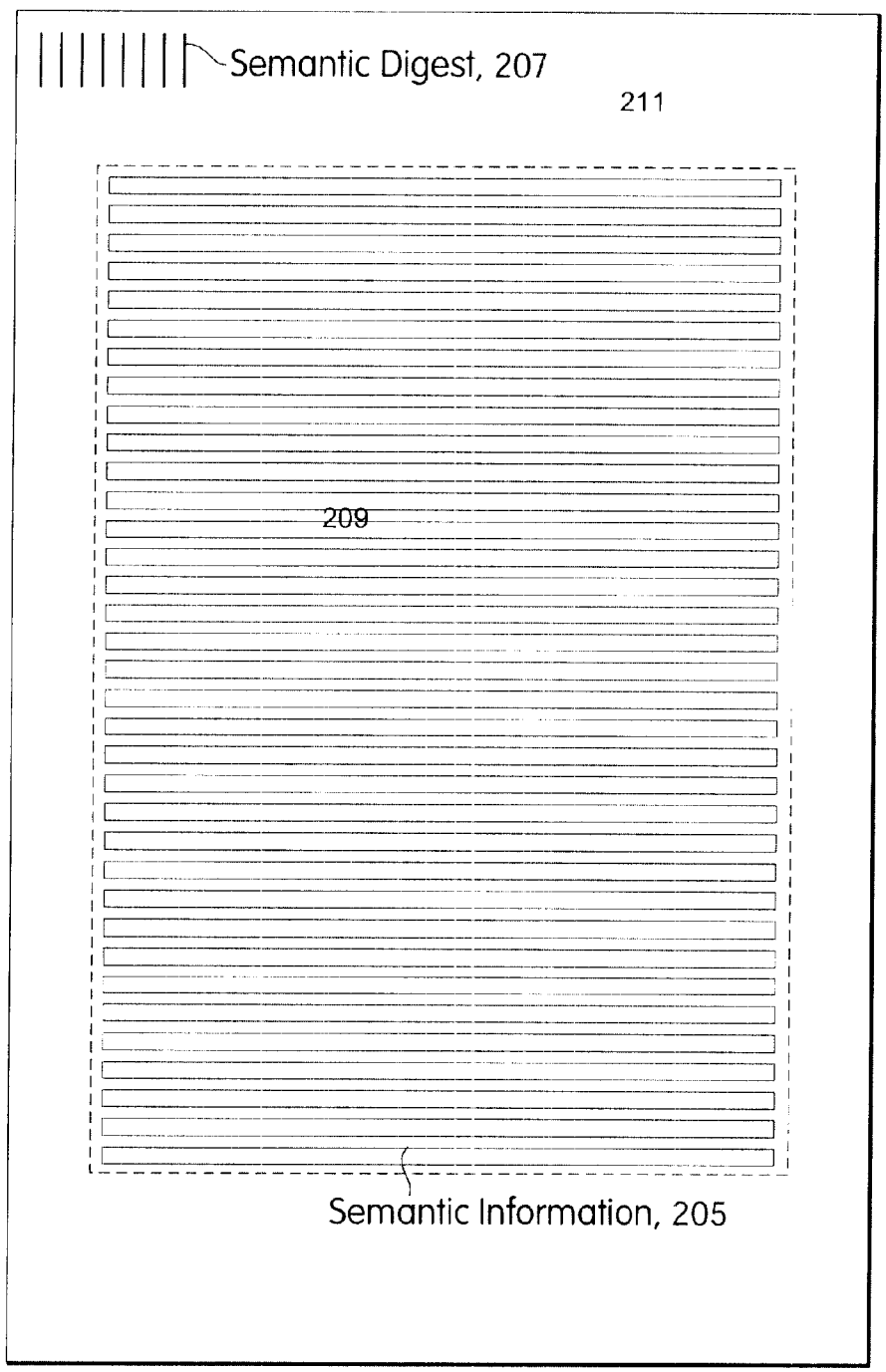
FIG. 2 is a diagram of a first embodiment of an analog form that can be authenticated.
Figure 3:
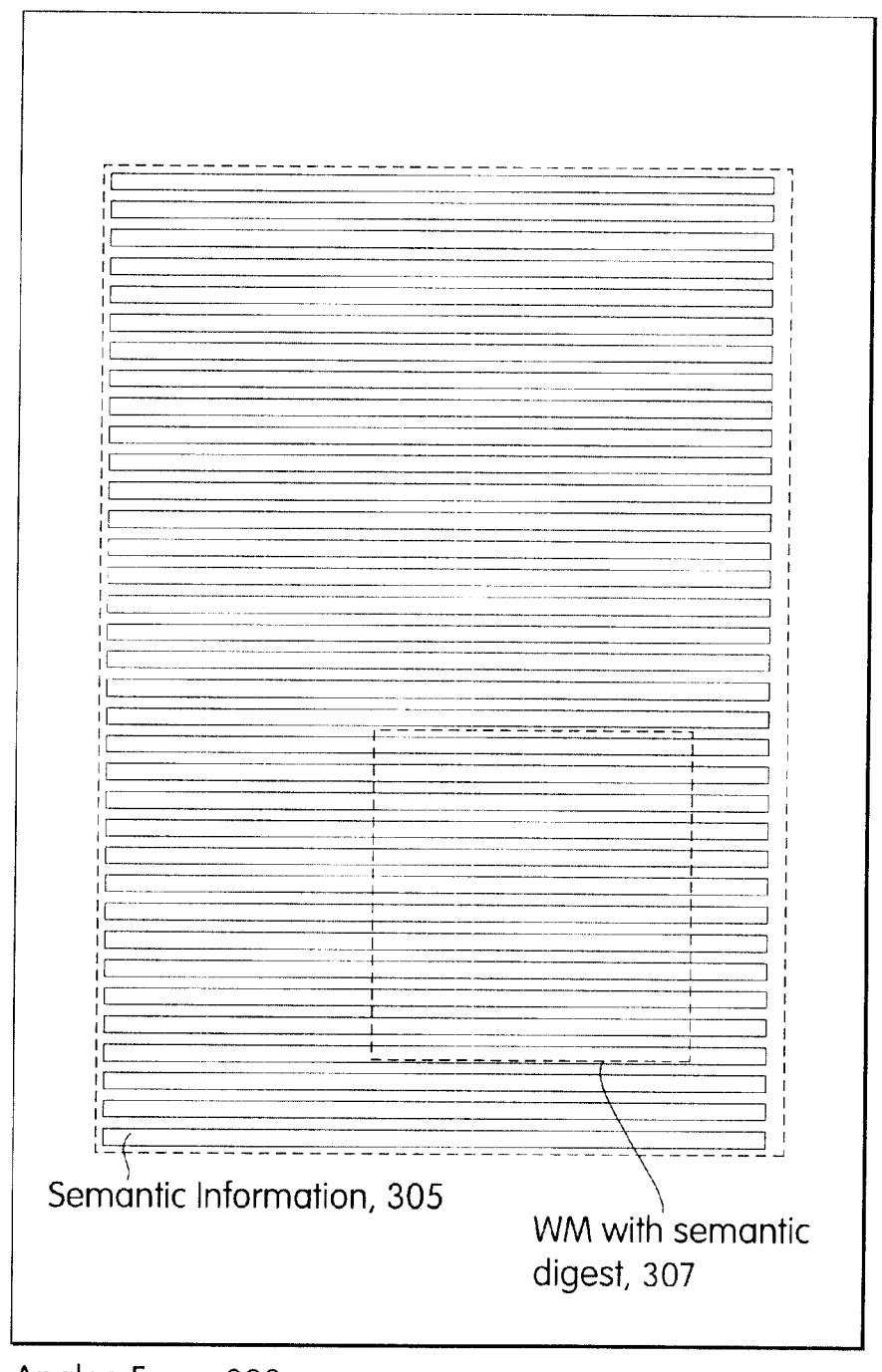
FIG. 3 is a diagram of a second embodiment of an analog form that can be authenticated.

Using Semantic Information to Authenticate an Analog Form: FIGS. 2 and 3

Because the semantic information must be present in the analog form, it may be read from the analog form and used to compute a new digest. If the old digest was similarly made from the semantic information in the digital representation and the old digest is readable from the analog form, the new digest and the old digest can be compared as described in the discussion of authentication above to determine the authenticity of the analog form.

FIG. 2 shows one technique 201 for incorporating the old digest into an analog form 203. Analog form 203 of course includes semantic information 205; here, analog form 203 is a printed or faxed document and semantic information 205 is part or all of the alphanumeric characters on analog form 203. Sometime before analog form 203 was produced, semantic information 205 in the digital representation from which analog form 203 was produced was used to make semantic digest 207, which was incorporated into analog form 203 at a location which did not contain semantic information 205 when analog form 203 was printed. In some embodiments, semantic digest 207 may be added to the original digital representation; in others, it may be added just prior to production of the analog form. Any representation of semantic digest 207 which is detectable from analog form 203 may be employed; in technique 201, semantic digest 207 is a visible bar code. Of course, semantic digest 207 may include additional information; for example, it may be encrypted as described above and semantic digest 207 may include an identifier for the user whose public key is required to decrypt semantic digest 207. In such a case, semantic digest 207 is a digital signature that persists in the analog form.

With watermarking, the semantic digest can be invisibly added to the analog form. This is shown in FIG. 3. In technique 301, analog form 303 again includes semantic information 305. Prior to producing analog form 303, the semantic information in the digital representation from which analog form 303 is produced is used as described above to produce semantic digest 207; this time, however, semantic digest 207 is incorporated into watermark 307, which is added to the digital representation before the analog form is produced from the digital representation and which, like the bar code of FIG. 2, survives production of the analog form. A watermark reader can read watermark 307 from a digital image made by scanning analog form 303, and can thereby recover semantic digest 207 from watermark 307. As was the case with the visible semantic digest, the semantic digest in watermark 307 may be encrypted and may also function as a digital signature.

Figure 4:
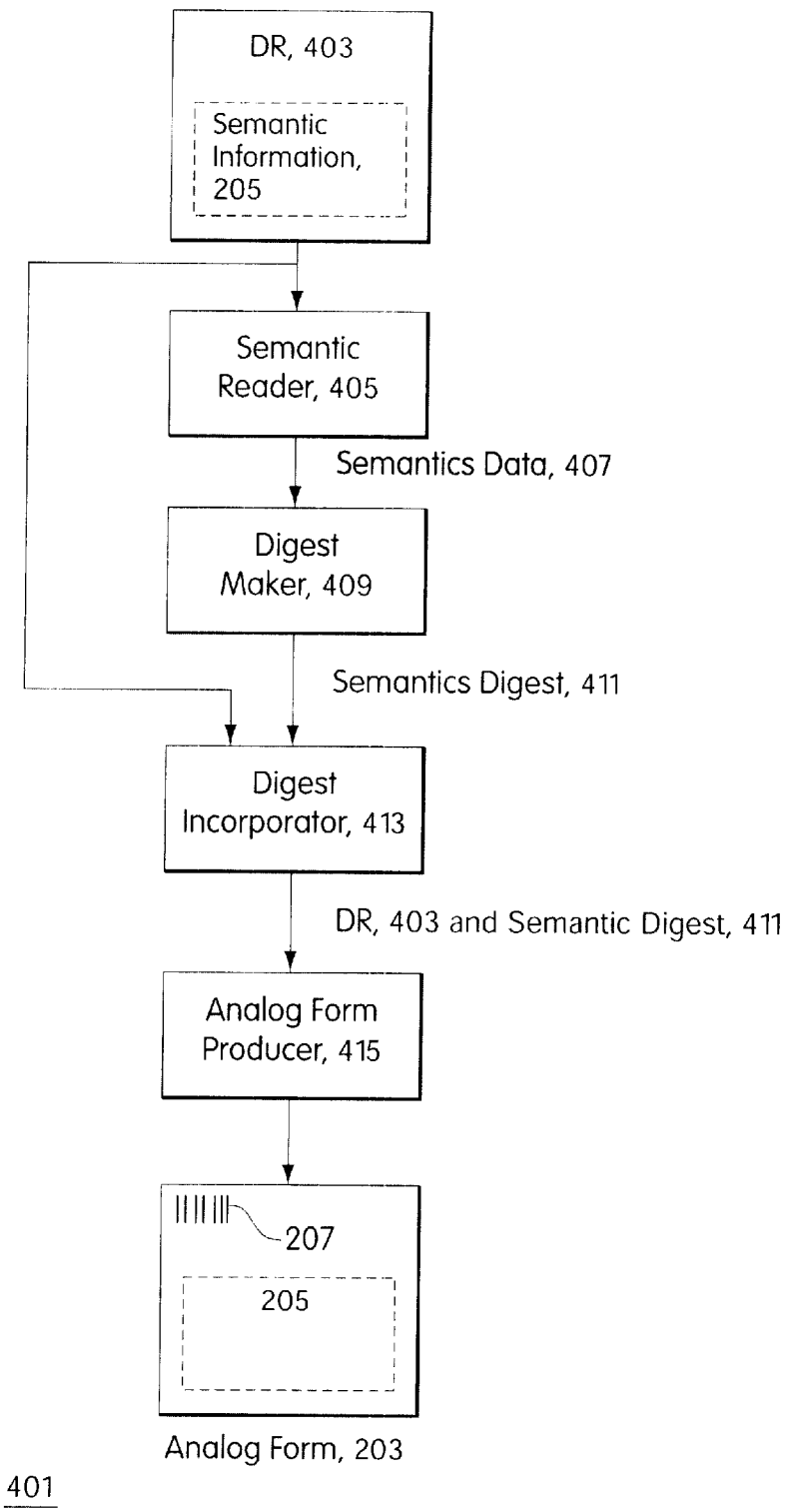
FIG. 4 is a diagram of a system for adding authentication information to an analog form.

Adding a Semantic Digest to an Analog Form: FIG. 4

FIG. 4 shows a system 401 for adding a semantic digest to an analog form 203. The process begins with digital representation 403, whose contents include semantic information 205. Digital representation 403 is received by semantics reader 405, which reads semantic information 205 from digital representation 403. Semantics reader 405's operation will depend on the form of the semantic information. For example, if digital representation 403 represents a document, the form of the semantic information will depend on how the document is represented. If it is represented as a bit-map image, the semantic information will be images of alphanumeric characters in the bit map; if it is represented using one of the many representations of documents that express alphanumeric characters as codes, the semantic information will be the codes for the alphanumeric characters. In the first case, semantics reader 405 will be an optical character reading (OCR) device; in the second, it will simply parse the document representation looking for character codes.

In any case, at the end of the process, semantics reader 405 will have extracted some form of semantic information, for example the ASCII codes corresponding to the alphanumeric characters, from representation 403. This digital information is then provided to digest maker 409, which uses it to make semantic digest 411 in any of many known ways. Depending on the kind of document the semantic digest is made from and its intended use, the semantic digest may have a form which requires an exact match with the new digest or may have a form which permits a "fuzzy" match. Digital representation 403 and semantic digest 411 are then provided to digest incorporator 413, which incorporates a representation 207 of digest 411 into the digital representation used to produce analog form 203. As indicated above, the representation must be incorporated in such a way that it does not affect semantic information 205. Incorporator 413 then outputs the representation it produces to analog form producer 415, which produces analog form 203 in the usual fashion. Analog form 203 of course includes semantic information 205 and representation 207 of semantic digest 411. Here, the bar code is used, but representation 207 could equally be part of a watermark, as in analog form 303. Components 405,409, and 413 may be implemented as programs executed on a digital computer system; analog form producer 415 may be any device which can output an analog form.

Authenticating an Analog Form that Has a Semantic Digest

Figure 5:
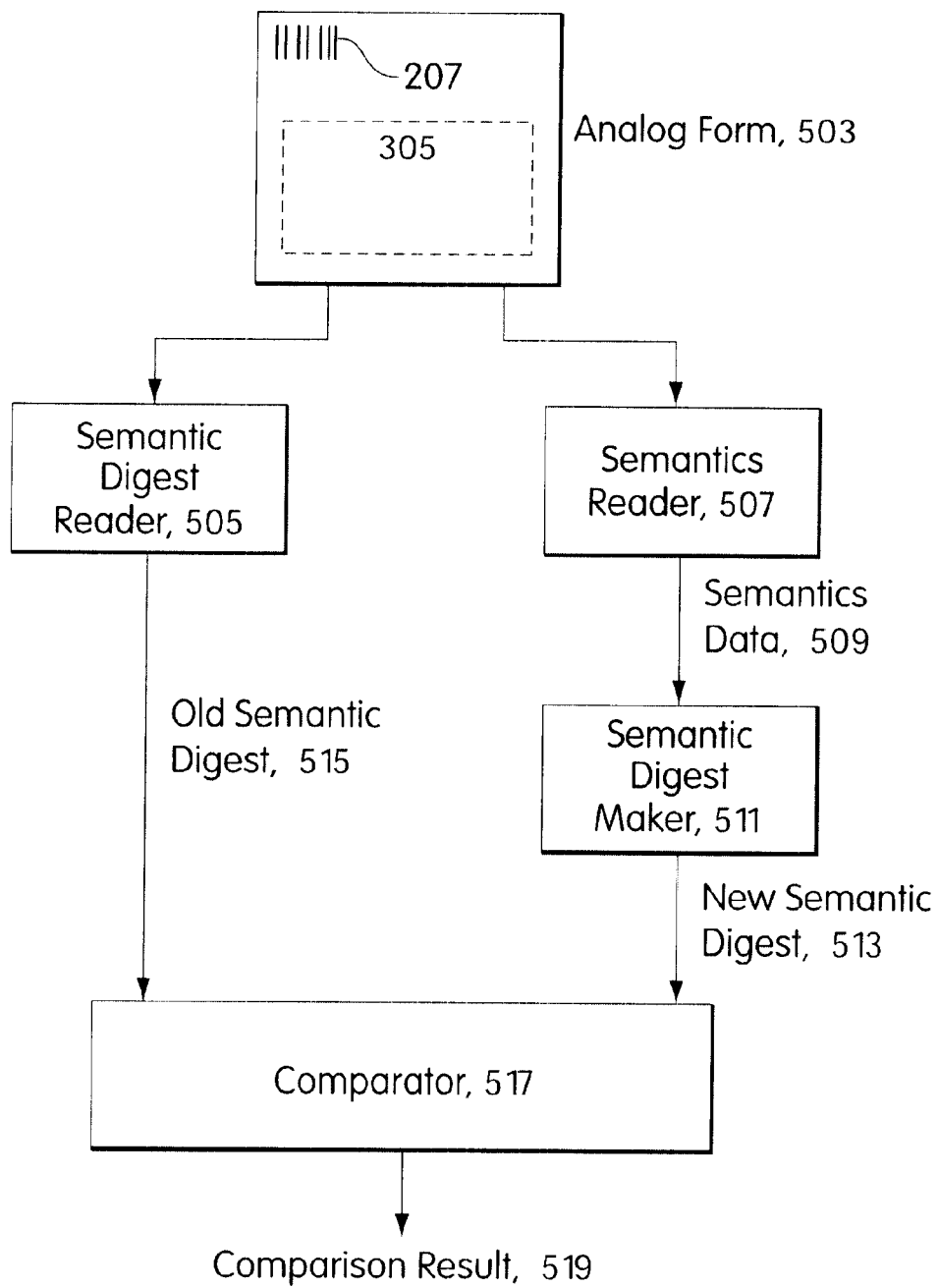
FIG. 5 is a diagram of a system for authenticating an analog form.

FIG. 5 shows a system 501 for authenticating an analog form 503 that has a semantic digest 207. Analog form 503 is first provided to semantic digest reader 505 and to semantics reader 505. Semantic digest reader 505 reads semantic digest 207; if semantic digest 207 is a bar code, semantic digest reader 505 is a bar code reader; if semantic digest 207 is included in a digital watermark, semantic digest reader 505 is a digital watermark reader which receives its input from a scanner. If semantic digest 505 must be decrypted, semantic digest reader 505 will do that as well. In some cases, that may require sending the encrypted semantic digest to a remote location that has the proper key.

Semantics reader 507 reads semantic information 305. If analog form 503 is a document, semantics reader 507 is a scanner which provides its output to OCR software. With other images, the scanner provides its output to whatever image analysis software is required to analyze the features of the image that make up semantic information 305. If analog form 503 is audio, the audio will be input to audio analysis software. Once the semantics information has been reduced to semantics data 509, it is provided to semantic digest maker 511, which makes a new semantic digest 513 out of the information. To do so, it uses the same technique that was used to make old semantic digest 515. Comparator 517 then compares old semantic digest 515 with new semantic digest 513; if the digests match, comparison result 519 indicates that analog form 203 is authentic; if they do not, result 519 indicates that they are not authentic. What "match" means in this context will be explained in more detail below.

"Matching" Semantic Digests

With the digests that are normally used to authenticate digital representations, exact matches between the old and new digests are required. One reason for this is that in most digital contexts, "approximately correct" data is useless; another is that the one-way hashes normally used for digests are "cryptographic", that is, the value of the digest reveals nothing about the value from which it was made by the hash function, or in more practical terms, a change of a single bit in the digital representation may result in a large change in the value produced by the hash function. Since that is the case, the only comparison that can be made between digests is one of equality.

In the context of authenticating analog forms, the requirement that digests be equal causes difficulties. The reason for this is that reading semantic information from an analog form is an error-prone operation. For example, after many years of effort, OCR technology has gotten to the point where it can in general recognize characters with 98% accuracy when it begins with a clean copy of a document that is simply formatted and uses a reasonable type font. Such an error rate is perfectly adequate for many purposes; but for semantic information of any size, a new digest will almost never be equal to the old digest when the new digest is made from semantics data that is 98% the same as the semantics data that was used to make the old semantic digest. On the other hand, if the semantics data obtained from the analog form is 98% the same as the semantics data obtained from the digital representation, there is a very high probability that the analog form is in fact an authentic copy of the digital representation.

Precise Matches

Of course, if the semantic information is limited in size and tightly constrained, it may be possible to require that the digests be exactly equal. For example, many errors can be eliminated if what is being read is specific fields, for example in a check or identification card, and the OCR equipment is programmed to take the nature of the field's contents into account. For example, if a field contains only numeric characters, the OCR equipment can be programmed to treat the letters o and O as the number 0 and the letters l,i, or I as the number 1. Moreover, if a match fails and the semantic information contains a character that is easily confused by the OCR equipment, the character may be replaced by one of the characters with which it is confused, the digest may be recomputed, and the match may again be attempted with the recomputed digest.

Fuzzy Matches

Where the semantic information is not tightly constrained, the digests must be made in such a fashion that closely-similar semantic information produces closely-similar digests. When that is the case, matching becomes a matter of determining whether the difference between the digests is within a threshold value, not of determining whether they are equal. A paper by Marc Schneider and Shih-Fu Chang, "A Robust Content Based Digital Signature for Image Authentication", in: *Proceedings of the* 1996 *International Conference on Image Processing,* presents some techniques for dealing with related difficulties in the area of digital imaging. There, the problems are not caused by loss of information when a digital representation is used to make an analog form and by mistakes made in reading analog forms, but rather by "lossy" compression of images, that is, compression using techniques which result in the loss of information. Because the lost information is missing from the compressed digital representation, a digest made using cryptographic techniques from the compressed digital representation will not be equal to one made from the digital representation prior to compression, even though the compressed and uncompressed representations contain the same semantic information. Speaking generally, the techniques presented in the Schneider paper deal with this problem by calculating the digest value from characteristics of the image that are not affected by compression, such as the spatial location of its features. Where there are sequences of images, the digest value is calculated using the order of the images in the sequences.

Analogous approaches may be used to compute the semantic digest used to authenticate an analog form. For example, a semantic digest for a document can be computed like this:

1. Set the current length of a digest string that will hold the semantic digest to "0";
2. Starting with the first alphanumeric character in the document, perform the following steps until there are no more characters in the document:
   a. Select a next group of characters;
   b. for the selected group,
      i. replace characters in the group such as O,0,o; I,i,l, 1; or c,e that cause large numbers of OCR errors with a "don't care" character;
      ii. make a hash value from the characters in the group;
      iii. append the hash value to the semantic digest string;
   c. return to step (a).
3. When there are no more characters in the document, make the semantic digest from the digest string.

When computed in this fashion, the sequence of values in the semantic digest string reflects the order of the characters in each of the sequences used to compute the digest. If the sequence of values in the new semantic digest that is computed from the analog form has a high percentage of matches with the sequence of values in the old semantic digest, there is a high probability that the documents contain the same semantic information.

Applications of Authentication with Analog Forms

One area of application is authenticating written documents generally. To the extent that the document is of any length and the digest is computed from a significant amount of the contents, the digest will have to be computed in a fashion which allows fuzzy matching. If the digest is computed from closely-constrained fields of the document, exact matching may be employed.

Another area of application is authenticating financial documents such as electronic cash, electronic checks, and bank cards. Here, the fields from which the digest is computed are tightly constrained and an exact match may be required for security. In all of these applications, the digest or even the semantic information itself would be encrypted as described above to produce a digital signature.

Universal Paper & Digital Cash

Digital cash is at present a purely electronic medium of payment. A given item of digital cash consists of a unique serial number and a digital signature. Authentication using semantic information permits digital cash to be printed as digital paper cash. The paper cash is printed from an electronic image which has a background image, a serial number, and a money amount. The serial number and the money amount are the semantic information. The serial number and the money amount are used to make a digital signature and the digital signature is embedded as an electronic watermark into the background image. The paper cash can be printed by any machine which needs to dispense money. Thus, an ATM, can dispense digital paper cash instead of paper money. Similarly, a vending machine can make change with digital paper cash and a merchant can do the same. The digital paper cash can be used in the same way as paper money. When a merchant (or a vending machine) receives the digital paper cash in payment, he or she uses a special scanner (including OCR technology and a watermark reader) to detect the watermark (i.e. the serial number and money amount) from the printed image, and send them to the bank for verification in the same fashion as is presently done with credit cards.

Digital Checks

Digital checks can be made using the same techniques as are used for digital paper cash. The digital check includes a background image, an identifier for the bank account, an amount to be paid, and the name of the payer. The payer's private key is used to make a digital signature from at least the identification of the bank and the amount to be paid, and the digital signature is embedded as an electronic watermark in the background image. Writing a digital check is a three-step process: enter the amount, produce the digital signature from the bank account number and the amount using the payer's private key, and embed the digital signature into the background image. The bank verifies the check by detecting the watermark from the digital check., decrypting the digital signature with the payer's public key, and comparing the bank account number and the amount from the image with the bank account number and the amount on the face of the check. A digital check can be used in either electronic form or paper form. In the latter case, a scanner (including OCR technology and watermark reader) is needed to read the watermark from the paper check.

Authentication of Identification Cards

The techniques described above for authenticating digital paper cash or digital checks can be used with identification cards, including bankcards. The card number or other identification information appears on the face of the card, is encrypted into a digital signature, and is embedded as a digital watermark in the background image of the bankcard. The encryption can be done with the private key of the institution that issues the card. The merchant uses use a scanner to detect the digital signature (i.e. card number or other ID) from the card, and compare the signature with the authentication stored inside the card. This technique can of course be combined with conventional authentication techniques such as the holographic logo.

Additional Classes of Semantic Information

As defined in the parent of the present patent application, semantic information is information that must be present in any analog form made from the digital representation of an object. Further consideration of the necessary properties of semantic data has lead to the realization that there are many kinds of semantic information and that the semantic information may exist at a number of different levels in a digital representation or an analog form.

- at the signal level: the semantic information may be high-order bits of image pixels or audio samples or the most significant frequency components computed by a visual perception model for images and video or by an auditory perception model for audio.
- at the vector level: the semantic information may be features that are represented by vector data. Examples for images are edges, shapes, areas, and objects; for video, time relationships between frames may be used as well. With audio, the instrumental or vocal sounds are such features.
- at the level of content codes: the semantic information may be codes that represent the content of the object: One example of content codes is the codes that represent the alphanumeric characters in documents, for instance the widely-used ASCII codes for alphanumeric characters. These and other codes representing alphanumeric characters are used in the files produced by various word processors and document distribution systems. Another example of content codes is the MIDI codes used to define the notes to be playedin MIDI files.
- at the appearance or presentation level: the semantic information may be a description of the appearance or presentation of the content. Examples are fonts, colors, sizes, and other appearance features of word processor files, style tags and style sheets in HTML, XML or SGML files and analogous features of MIDI files.
- at the metadata level: metadata is information which is not itself part of the digital representation, but is a description of the contents of the digital representation. The metadata may either appear in the analog form or be inferable from the analog form. Examples are labels and captions in images and video, scripts in video and audio, mathematical descriptions of relationships between objects in images or video, and the words for a piece of music.

The authentication techniques of the parent patent application can be used with semantic information belonging to any of the above classes. To make the authentication information from a given kind of the semantic information, one merely requires a device that can read the information. Examples are a function to compute the most significant bits of image pixels or audio samples, a device that recognizes objects in images or video or audio features in audio, a device which reads the metadata, or a voice-to-text conversion device which converts voice to text (which is then used to compute the authentication information).

The semantic information can be used to authenticate digital representations made from analog forms of objects, as described in the parent of the present patent application and can also be used to authenticate any digital representation, whether or not made from an analog form. To make a digital representation that can be authenticated from an analog form of an object, one employs devices that can sense the semantic information in the analog form as described in the parent of the present application. Examples are a scanner, digital cameras and video cameras, a microphone and a recorder, or an analog to digital converter for signal information. Such devices are of course not necessary if the object being authenticated was originally in digital form. An example of authentication of objects that are never in analog form is authenticating video frames produced by a digital video surveillance system.

A General Approach to Embedding Authentication Information: FIG. 2

The parent patent application described how authentication information could be included anywhere in a document as long as its presence did not affect the semantic representation. The technique used in documents is a specific example of the following general technique, namely computing the authentication information based on a part (P1) of the document or other object and embedding it in a part (P2) which does not overlap with P1. Since there is no overlapping, the modification of P2 that is a consequence of embedding the authentication information in it does not affect P1.

The general technique can be used with semantic information as described above or with any other information in the object which must remain unaffected when the authentication information is embedded in the object. As can been seen from this fact, the technique is useful not only for authentication of analog forms, but also for authentication of digital representations. Where no analog forms are involved, all that is required is that P1 does not overlap P2 in the digital representation. Where analog forms are involved, P1 must also not overlap P2 in the analog form made from the digital representation. In the document context of FIGS. 2 and 3, in FIG. 2, P1 209 is the characters of the document and P2 211 is the margin in which the barcode is placed; in FIG. 3, P1 is the characters and P2 is a portion of the watermark which is separate from the characters. Other examples of the technique follow:

- P1 is the M most significant bits of each image pixel's RGB values or audio samples, P2 is bits in the remaining least significant bits.
- P1 is the M most significant frequency coefficients in a DCT block (a image block transformed by Discrete Cosine Transformation), P2 is frequency coefficients in the remaining least significant frequency coefficients in the DCT block.
- P1 is a specific region of an image in the spatial domain which contains all semantic information, while P2 is the remaining regions of the image.
- P1 is text of a document, which contains all semantic information, while P2 is the image of the document, represented in pixels.
- P1 is a text layer of a document, which contains all semantic information, while P2 is the background image layer of the document.
- P1 is text of a document, which contains all semantic information, while P2 is a graphics (such as a seal, logo, stamp) in the document, which does not overlap with the text.
- P1 is a class of semantic information (signal-level, vector-level, text-level, appearance-level, or metadata-level, defined as above), while P2 is the document data at another level. For example, P1 is text-level semantic information and P2 is the metadata, appearance-level description, or signal-level data of the document.

As used in the above descriptions, layer means a part of the digital representation or analog form that can be separated from other parts of the digital representation or the analog form. Examples of layers are:

1) the alphanumeric characters of a document and the image of the formatted document containing those alphanumeric characters.
2) the alphanumeric characters of a document and graphics components of the document that don't overlap with the characters.
3) the alphanumeric characters and a background image that visually overlays the document containing the characters.

Improving the Capture of Semantic Information with OCR

The parent discloses a method of using OCR to capture the semantic information from the analog form of the authenticated document. The problem with OCR techniques is that achieving a recognition correctness rate of 100% is hard, yet this is often required by the authentication verification techniques. One solution to this problem, "fuzzy" matching, was described in the parent. Another is including error correction code with the embedded authentication information that will permit correction of errors caused by confusing alphanumeric characters. One simple approach is to keep track of the positions of common confusing characters such as "1" or "l", "m" or "n", "0" or "o" in semantic information when the embedded authentication information is produced in the original electronic form of the object and then ignore the characters at those positions when the embedded authentication information is produced. The positions of the ignored characters can then be included as an error code in the electronic version of the document. During authenticity verification, the OCR'd characters at the positions specified in the error correction code can be similarly ignored when computing the authentication information in the verification process.

Another approach is including the common confusing characters with the embedded authentication information. The following steps are performed when the semantic information and embedded authentication information are produced in the original electronic form of the object:

1. Sequentially search for the confusing characters in semantic information of the original electronic form of the object and put these characters into a character stream S1.
2. Apply encoding techniques (e.g. if there are total 7 pairs of confusing characters, 3 bits are needed to encode all pairs) and lossless compression such as Huffman encoding to reduce the size of the character stream. The encoded and compressed stream is S2.
3. Embed S2 as a watermark or barcode into the document in the same way as the authentication information is embedded. The watermark can be embedded into a background image or into a graphics (logo, seal, stamp, etc.) that doesn't overlap with text.

S2 may be further encoded using error correcting codes such as Reed-Solomon codes, BCH codes, the binary Golay code, CRC-32 or Hamming code. For a larger document, S2 may be split into multiple pieces and each piece may be embedded into a unit (e.g. a page) of the document. As an alternative, the confusing characters in the semantic information may be collected from each unit (e.g. page) of the original electronic form of the object and put into a character stream S2 for the unit. S2 is then encoded and compressed, and embedded in this unit of the document. The advantage here is that each unit of document can be self-authenticated.

The following steps are performed when the verification process:

Sequentially search for the confusing characters in semantic information that is recognized by a OCR system and put these characters into a character stream S1

Read S2

Use S2 to correct possible errors in S1

The above steps are also applied where the error code is made on a per-unit basis.

Particularly Useful Kinds of Semantic Information

What kinds of semantic information should be used for authentication depends on the application. In general, the semantic information should be information which is absolutely necessary for the digital representation or the analog form to perform its proper function. Some applications and the preferred semantic information for the application are:

Banknotes or other currency: for each note: serial number, printing place, amount, treasurer Personal identification documents: for each document: name, birth date, issuer, expiration Official documents generally (immigration papers, tax forms, licenses, certificates of title, diplomas, and the like): for each document: name of person to whom the document pertains and document number Documents that give a person an entitlement to something (checks, credit and debit cards, shares of stock, tickets of all kinds, coupons and credit vouchers): for each document: identification of the issuing entity, details of the entitlement, and document number Details for private documents that give entitlements depend on the kind of private document. For a check, the semantic information includes the name and number of the bank or other fiduciary information, the amount, the check number, and the date of the check. For a theater ticket, it includes the theater's name, the name of the performance, the date and time of the performance, and a serial number for the ticket.

Types of Media with which the Authentication Techniques can be Used

The authentication techniques described above can be used with any object that has a first portion that contains semantic information from which the authentication information can be computed and a second portion that is separate from the first portion in which the semantic information can be embedded. The first and second portions may be parts of the object itself, may be parts of a label or document that accompanies the object, or the object may be the first portion and the label the second. The first portion may be of any material from which the semantic information may be read and the second portion may be any material which permits embedding and reading of the embedded authentication information.

One example here would be the authentication of an autographed baseball; another is the authentication of a plastic ID. In the case of the autographed baseball, the second portion must be a separate object from the baseball, since the authentication information cannot be printed on the baseball without reducing the baseball's value. The first portion is the signature on the baseball (treated as an image); the authentication information is a digital signature made from the image of the signature and encrypted with the private key of an authentication authority, and the second portion is a certificate of authenticity that accompanies the baseball and has the authentication information embedded in it.

In the case of the plastic ID card, the first portion is the part of the card that contains the identified person's name, birth date, and other identity information and the second portion can be a photo of the identified person. The authentication information is been incorporated into the photo as a digital watermark.

Figure 6:
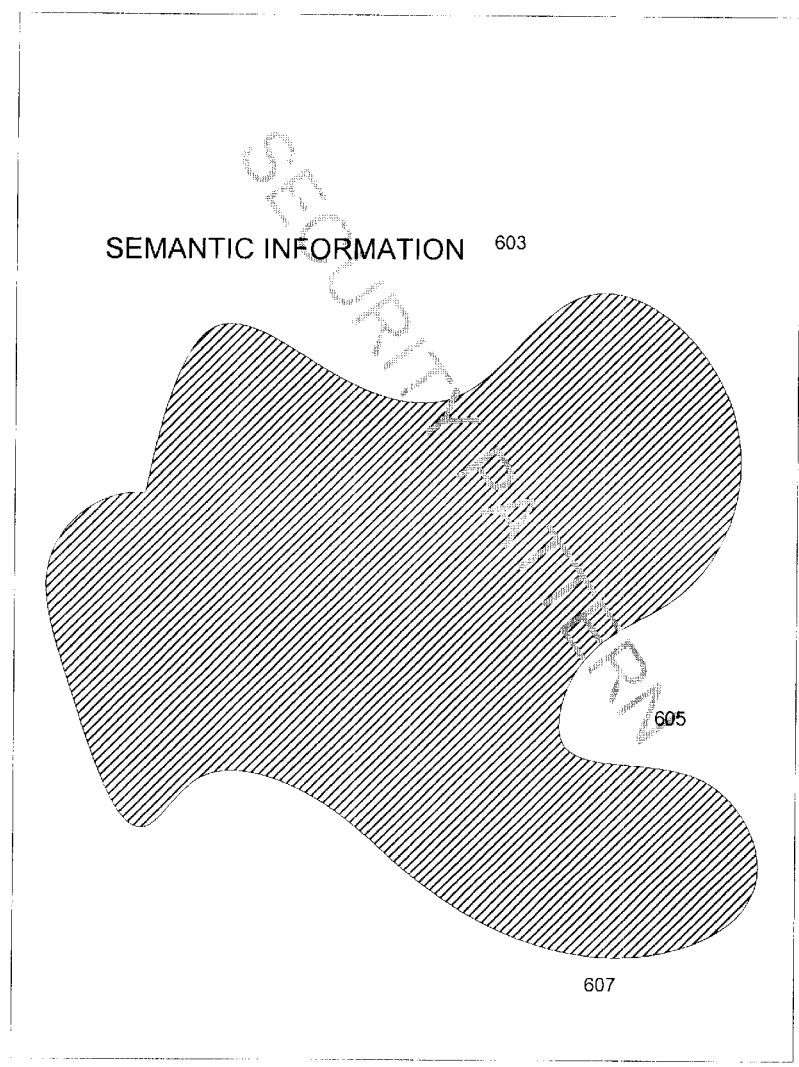
FIG. 6 is a diagram of an analog form that includes a security pattern.

Combining the Authentication Techniques with Security Features in the Analog Form: FIG. 6

A significant barrier to the use of authentication information in analog documents where the authentication information is based on semantic information in the analog document and embedded in a watermark is that high-quality photocopying copies the watermark along with the semantic information and does so in sufficient detail that the authentication information can still be read from the watermark.

This problem can be dealt with by adding information to the analog form that cannot be copied by even a high-quality photocopier. Ideally, the information will be in the form of machine-readable security patterns. The larger the pattern or the more variations it has, the more secure the system. An example of such a pattern is a security code that is printed on the analog form in invisible magnetic ink. The pattern is then used to compute the authentication information embedded in the watermark. Since the pattern is part of the authentication information embedded in the watermark, verification succeeds only if both the watermark and the security code have been copied. FIG. 6 shows how this is done in document 601. Document 601 includes semantic information 603 and watermark 607 in which authentication information that is computed using semantic information 603 is embedded. Additionally, document 601 includes security pattern 605 which is machine readable but cannot be copied by a copier. The authentication information embedded in watermark 607 is produced using both semantic information 603 and security pattern 605 and the device that reads the security pattern can provide the security pattern to the device that authenticates the document. As can be seen from the use of security pattern 605 to produce the authentication information, security pattern 605 can be seen as a kind of semantic information that is an attribute only of the analog form.

There are a number of techniques available for including security pattern 605 in the analog form:

Fluorescent inks or fluorescent fibers in the analog form: the inks or fibers are revealed under ultraviolet light. Combinations of density, colors, shapes and other features of the inks or fibers can be used to make a large number which is visible under ultraviolet light. This number can be detected by a device (e.g. a digital camera with a UV lens) automatically, and can also be part of the information used in the authentication process. These inks or fibers are not transferable by photocopying. Therefore, to forge a document, a counterfeiter must be able to access the inks/fibers as well as being able to copy the digital watermark.

Magnetic Inks: magnetic inks enable areas of a document to be read by a magnetic detector.

Microprinting: tiny messages can be worked into designs and printed by either intaglio or litho printing processes. With most counterfeiting techniques these tiny messages are lost. The tiny message contains the security code.

Figure 7:
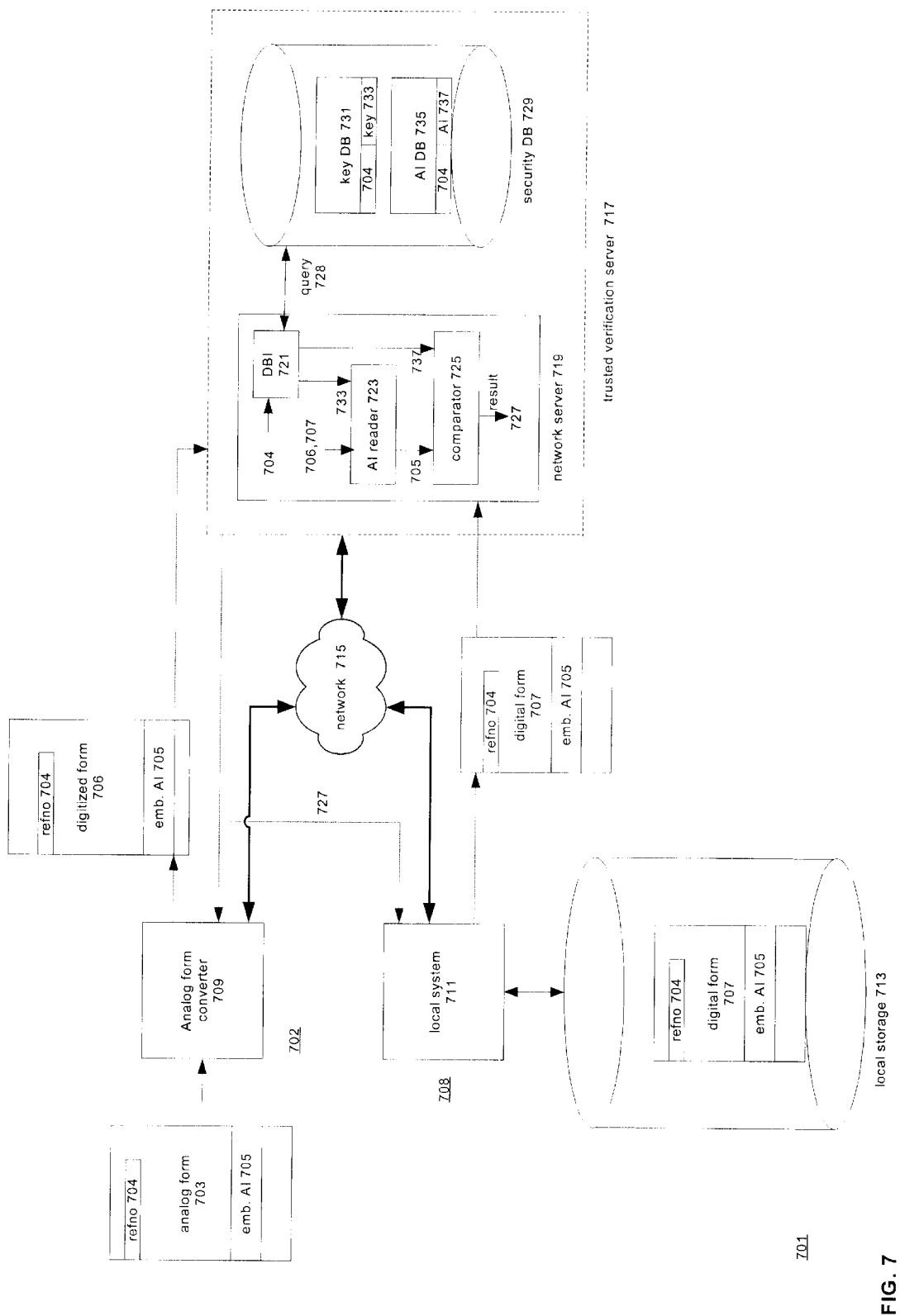
FIG. 7 is a diagram of a network system for verifying authenticity of objects.

Network Object Authentication System: FIG. 7

An advantage of the authentication techniques disclosed in the parent patent application is that local authentication is possible because all of the information needed for the authentication of an object is in the object itself The corresponding drawback is that having all of the information in the object makes it much easier for a counterfeiter who is trying to understand how the authentication information is embedded to do so. This problem can be avoided by having the embedded authentication information include information that is known only to a trusted verification server that is available via a network. The object is digitized if it is not already and the digitized version is sent via a network to the trusted verification server, which retrieves the embedded authentication information from the digitized version and compares it to the authentication information known to the trusted verification server. The trusted verification server then indicates to the source of the object whether the object is authentic or not, as indicated by the results of the comparison.

FIG. 7 shows a network authentication system 701 that works as just described. The components of network authentication system 701 are connected by network 715, which can be any arrangement that lets the system components communicate with one another. The objects that are authenticated may be either in analog form 703 or in digital form 707. In either case, they have in addition to embedded authentication information 705 a reference number 704 which identifies the object to the trusted verification server. The reference number may be any kind of number, character string, code, or other pattern which can serve as an identifier The reference number may be represented on the object in any computer-readable fashion and may have other functions as well. For example, it can be Product Universal Barcode, ID card number, bankcard number, passport number, student ID, social security number, ISBN, and so forth. The reference number may further be represented on the object as a public watermark. A public watermark is a digital watermark that can be read without a key or with a public-known key.

Multiple trusted verification servers may co-exist, with each server providing same or different verification services. For example, a cluster of trusted verification servers may verify credit cards for financial institutions or credit bureaus, while another cluster may verify passports and other government-issued documents. The reference number may serve not only to uniquely identify the document, but also to indicate the cluster of servers it should be routed to. In this case, a universal verification server could be introduced to route the documents to various verification servers according to their reference numbers. Thus, all users are able to verify all authenticated items through a single point of contact (e.g. a web site). Alternatively, each of the verification servers could have the routing list for the reference numbers and could route any document that it could not verify itself to the proper verification server for the document.

Continuing with the details of system 701, when the object is in analog form, the system works as shown at 702: an analog form converter converts analog form 703 to a digitized form 706 and sends it via network 715 to trusted verification server 717. Analog form converter 709 also receives an indication 727 from trusted server 717 whether the analog form is authentic. The flow of information between analog form converter 709 and trusted verification server 717 is indicated by the dotted arrows.

When the object is in digital form, the system works as shown at 708: digital form 707 is stored in local storage 713 belonging to local system 707. When local system 711 desires to authenticate digital form 707, it uses network 715 to send a copy of the digital form to trusted verification server 717. Local system 711 also receives an indication 727 from trusted server 717 whether digital form 707 is authentic. As before, information flows between local system 711 and trusted verification server 717 are shown by dotted arrows.

Trusted verification server 717 has two major components: network server 719 and security database 729. Security database 729 contains a key database 731 that relates decryption keys 733 to reference numbers 704 and an authentication information database 735 that relates authentication information 737 to reference numbers 704. Network server 719 handles communications between it and the other components via the network and also includes the components needed to do the actual verification: database interface 721, which is a query interface to database 729, AI reader 723, which can read the authentication information from the part of the object in which it is embedded, for example, from a watermark, and comparator 517, which compares two items of authentication information with one another to determine whether they match. Network server 719 returns the result 727 of the comparison to the source of the object being authenticated.

Digitized form 706 and digital form 707 are both processed in exactly the same way in trusted verification server 717. Continuing with digitized form 706, network server 719 first reads reference number 704 from the digitized form and uses reference number 704 in DBI 721 to query security database 729 for key 733 and authentication information 737. Then, network server 719 provides digitized form 706 to authentication information reader 723, which uses key 733 returned by the query to read embedded authentication information 705 from digitized form 706. Embedded authentication information 705 and authentication information 737 returned by the query are then provided to comparator 725, which determines whether the two versions of the authentication information match. The result of the comparison is returned at 727 to the source of the object being authenticated. Comparator 725 may of course use any technique for comparison which returns a meaningful result.

Many variations on and refinements of system 701 are of course possible. Reference number 704 may not be part of the object, but may be input by the user as part of the authentication process. Analog form converter 709 may analyze the quality of digitized form 706 before sending it to server 717 and send digitized form 706 only if the analysis indicates that verification server 717 will be able to read reference number 704 and the part of the object in which the authentication information is embedded. If analog form 703 includes security patterns like those discussed above, analog converter 709 may also check for the proper security patterns before sending digitized form 706 on. If it finds patterns, it can send them to verification server 717 as well for checking in the same manner as described for authentication information 737. Additionally, the security pattern may provide the reference number 704. The authentication information may be derived from the semantic information in the object, as described in the parent of the present application, and verification server 717 may contain only the key needed to locate and/or decrypt the embedded authentication information. There may be a number of levels of encryption. For example, the reference number may be encrypted using a public key belonging to the trusted verification server. Additionally, key 733 may be used either to locate the embedded authentication information or to decrypt it, or both, and another key may be stored in database 729 and used for the other purpose. Embedded authentication information may be hidden in a watermark, or it may be simply contained in a barcode or other visible pattern.

Applications of Network Authentication System 701

Authentication of Credit Cards in E-Commerce

A continuing problem with E-commerce is that the Web merchant has no proof that the person making a credit card purchase on the Internet is in actual possession of the credit card whose number he or she is providing to the Web merchant. Network authentication server 701 can solve this problem. In this application, analog form converter 709 is a PC that includes apparatus such as a Web camera for making an image of the credit card. As part of the Web purchasing procedure, the purchaser can send the image of the card to trusted verification server 717, which can be operated by the credit card company, the credit card provider, or a credit bureau. Server 717 performs authentication as described above and stops the transaction if the authentication fails. In this application, the authentication information that is on the card and stored in the database may include a photograph of the user.

Authentication of Documents Generally

There are many situations in which one party needs to authenticate a document received from another. For example, if an employer receives a work permit from a would-be employee, the employer needs to authenticate the work permit. Trusted verification server 717 can be employed generally to solve such problems. In order for server 717 to be useful, the party issuing the document must receive reference number 704 and authentication information 737 from the entity operating server 717 before making analog form 703. When analog form 703 is made, reference number 704 is printed on it, as is a watermark that has authentication information 737 embedded in it. The watermark may be in a discrete part of the document, such as a seal or portrait, or it may be in the entire image of the document. In some embodiments, the verification server may provide the watermark to the issuing party with the authentication information already imbedded in it. Anyone who receives analog form 703 can then use system 701 to authenticate it as just described.

The technique just described can be applied to other identification ID documents such as passport, immigration papers, and driver licenses. The major advantage of such online verification is that the reference number links the document with a variety of databases that have been build for years and are stored on organizational servers. The information in these databases can be used in the process of verifying and tracking the authenticity of the document. Another advantage of the technique is that the devices needed to read the semantic information and the embedded authentication information and to compare the embedded authentication information with either the authentication information computed from the semantic information or with authentication information retrieved from the database are in the server, which substantially lowers the cost of the client devices to which the analog or digital forms are submitted for verification of their authenticity.

Conclusion

The foregoing Detailed Description has disclosed to those skilled in the arts to which the inventions disclosed therein pertain how to make and use the inventions and has also disclosed the best mode presently known to the inventor of practicing the inventions. The principles of the inventions disclosed herein are broad and applicable in many areas. While the inventors have given many specific examples of ways of using and implementing their inventions, it will be immediately apparent to those skilled in the relevant arts that there are many other ways in which the inventions can be used and many other ways of implementing the inventions. With regard to incorporating authentication information in an object, all that is required is that the information used to make the authentication information be in a location in the object which is separate from the location where the authentication information it is embedded. With objects that remain digital, the locations need only be non-overlapping parts of the digital representation; with objects that become analog forms which are then made into digital representations, the locations must also not overlap in the analog form.

With regard to the verification server, the server can be at any location where it can receive digital representations of objects from sources, including belonging to the same system as the source. The reference number can be any kind of identification code and can be used in many ways in addition to its use as a reference number. Further, the server may do other processing in addition to performing verification, and the results of the other processing may be included in the verification process.

The method for dealing with confusing alphanumeric characters, finally, may be applied in any context where there are recurring patterns that confuse an OCR device.

For all of the foregoing reasons, the detailed description is to be regarded as being in all respects exemplary and not restrictive, and the breadth of the invention disclosed here in is to be determined not from the detailed description, but rather from the claims as interpreted with the full breadth permitted by the patent laws.

What is claimed is:

1. Apparatus which authenticates a digital representation of an object from which an analog form may be made, the apparatus comprising:

an authenticator which uses first information in a first portion of the digital representation to produce first authentication information, the first information also being obtainable from a third portion of the analog form that is made from the first portion; and an incorporator which incorporates the first authentication information in a second portion of the digital representation, the authentication information also being obtainable from a fourth portion of the analog form that is made from the second portion.

2. The apparatus set forth in claim 1 wherein:

the digital representation includes items of data, each item has more significant components and less significant components, the first portion is certain more significant components of the item, and the second portion is certain less significant components of the item.

3. The apparatus set forth in claim 2 wherein:

the items are pixels and the components are bits in the pixels.

4. The apparatus set forth in claim 2 wherein:

the items are signal samples and the components are bits in the signal samples.

5. The apparatus set forth in claim 2 wherein:

the items are DCT blocks containing frequency coefficients and the components are frequency coefficients in the DCT block.

6. The apparatus set forth in claim 1 wherein:

the digital representation includes an image, the first portion is a first specific region of the image, and the second portion is a second specific region of the image.

7. The apparatus set forth in claim 1 wherein:

the digital representation includes a document layer and an image layer, the first portion is the document layer, and the second portion is the image layer.

8. The apparatus set forth in claim 1 wherein:

the first portion is vector data in the object.

9. The apparatus set forth in claim 1 wherein:

the first portion is content codes in the object.

10. The apparatus set forth in claim 9 wherein:

The content codes are codes that represent alphanumeric characters; and the digital representation includes a document layer that contains the content codes and an image layer; and the first portion is the document layer and the second portion is a specific region of the image layer.

11. The apparatus set forth in claim 1 wherein:

the first portion is metadata in the object.

12. Apparatus which authenticates a digital representation of an object, the digital representation including frequency components and the apparatus comprising:

an authenticator which uses first information in more significant frequency components of the components to produce first authentication information; and an incorporator which incorporates the first authentication information into less significant frequency components of the components that do not overlap the more significant frequency components.

13. The apparatus set forth in claim 12 wherein:

the frequency components are coefficient values that represent significant frequency components that are computed by a perception model.

14. The apparatus set forth in claim 13 wherein:

the perception model is an auditory perception model.

15. The apparatus set forth in claim 13 wherein:

the perception model is a visual perception model.

16. The apparatus set forth in claim 12 wherein:

the frequency components are contained in DCT blocks.

17. The apparatus set forth in claim 12 wherein:

the first authentication information is a digital signature.

18. The apparatus set forth in claim 12 wherein:

the first authentication information is a secure hash code.

* * * * *